Feb. 10, 1970  W. J. EVERS  3,494,274
BREATHER BAG SHELTER
Filed Nov. 13, 1967

Inventor
William J. Evers
By Andrus & Starke
Attorneys

United States Patent Office 3,494,274
Patented Feb. 10, 1970

3,494,274
BREATHER BAG SHELTER
William J. Evers, Des Plaines, Ill., assignor to A. O. Smith Harvestore Products, Inc., Arlington Heights, Ill., a corporation of Delaware
Filed Nov. 13, 1967, Ser. No. 682,189
Int. Cl. A01f 25/16; B65d 87/16
U.S. Cl. 99—235                                4 Claims

ABSTRACT OF THE DISCLOSURE

A breathing system for a sealed storage structure such as a silo. Located on the exterior of the storage structure is a shelter containing a plurality of flexible, pressure responsive members such as breather bags. The exterior surfaces of the bags are exposed to atmospheric pressure while the inner surfaces are exposed to the gas pressure within the storage structure by means of a conduit system connecting the bags to the head space of the structure. In operation the pressure responsive members contract and expand in response to pressure changes and thus serve to equalize the pressure differential between the interior and exterior of the silo.

---

The invention relates to a breather system for sealed storage structures, such as silos, containing perishable materials. To minimize spoilage, the silo is sealed to keep air from contacting the stored material. However, in a sealed structure, pressure differentials will occur between the interior and the exterior of the silo. The differential arises because of the gas being generated by the stored material, because of variations in ambient temperature, and because of normal atmospheric pressure changes.

As too large a pressure differential between the exterior and interior surfaces of a silo can cause destructive stresses in the silo walls, a relief valve is usually provided in the roof of the silo. The relief valve allows air to move in or out of the silo to equalize the pressure differences whenever a predetermined differential is reached. In addition to the relief valve, a breather system, such as a flexible breather bag, is employed to equalize the exterior and interior pressures at differentials not reaching the extremes required to actuate the relief valve. The breather bag is usually located in the head space of the silo and has its interior surface exposed to atmospheric pressure by means of a neck secured within an opening in the roof of the silo. With the exterior surface of the bag exposed to pressures within the silo, the expansion and contraction of the bag in response to the pressure changes serves to balance the atmospheric and interior pressures, but nevertheless prevents outside air from contacting the stored material.

The use of a breather bag in the head space of the silo has certain disadvantages in that the breather bag occupies valuable storage space in the silo which could be used for storage of the perishable material. Also, the conventional breather bag can hinder the loading operation of the silo, since the material to be stored is generally loaded into the silo through an opening in the silo roof. The location of the bag in the head space of the silo necessitates supporting the bag temporarily in a position away from the inlet opening through which the material is being loaded into the silo, and then returning the bag to its normal position after the loading operation is completed. Additionally, it is sometimes desired to have a structure with a higher capacity breather system, which would necessarily aggravate the problems pointed out above.

In view of these problems, one object of the invention is to provide an improved breather system for a sealed storage structure.

Another object is to provide a breather system of high capacity which does not occupy storage space in the silo itself.

Another object is to provide a breather system for a sealed storage structure where the breather system utilizes a shelter structure separate from the storage structure.

Another object is to provide a high capacity breather system for a sealed storage structure which can utilize a conventional breather bag.

Another object is to provide an efficient breather system for a sealed storage structure which utilizes multiple breather bags for higher potential breather capacity.

Another object is to provide mountings for breather bags in a shelter structure whereby the mountings allow the breather bags to be conveniently raised and lowered.

The drawings illustrate the best mode presently contemplated of carrying out the invention.

Figure 1:
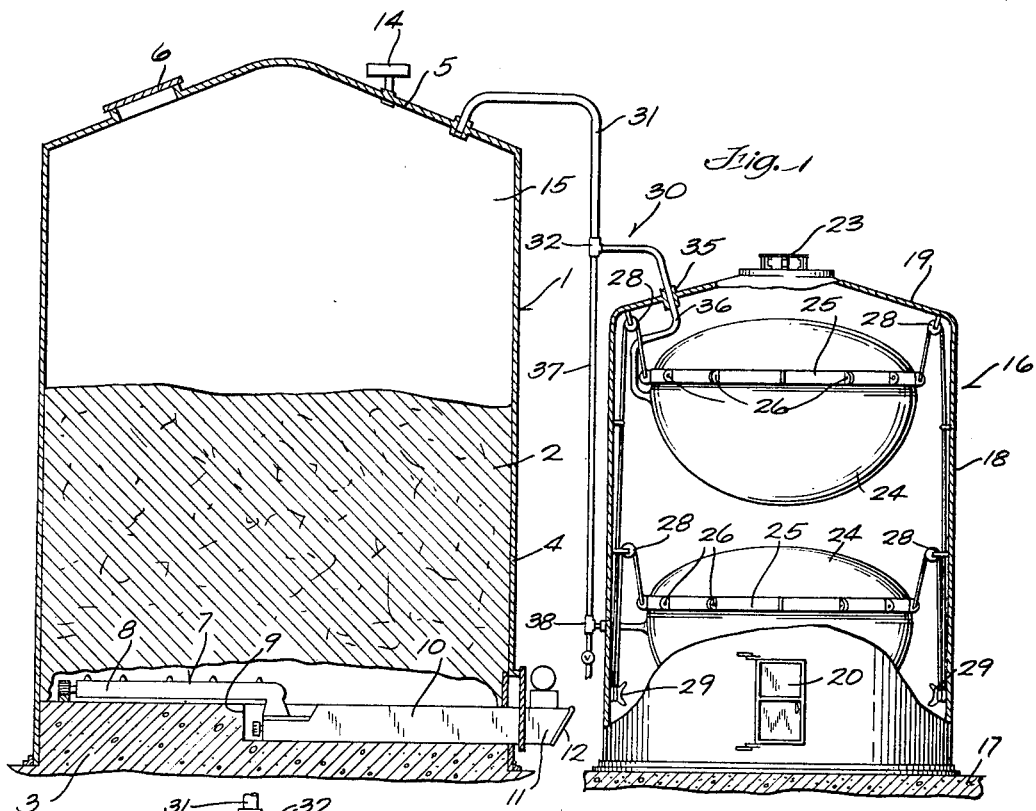
FIG. 1 is a vertical section of the storage unit showing the incorporation of the invention therein.
Figure 2:
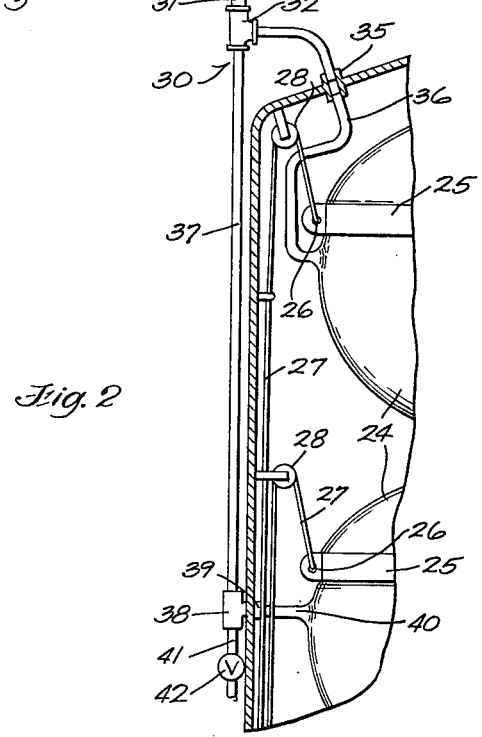
FIG. 2 is an enlarged fragmentary vertical section showing the breather bags mounted in the shelter.
Figure 3:
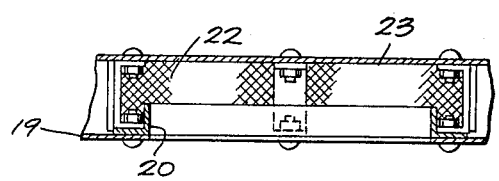
FIG. 3 is an enlarged fragmentary vertical section showing the vent mounted in the shelter.

The drawing illustrates a sealed storage structure or silo 1 which is adapted to contain a stored material 2. The silo 1 is supported on a foundation 3 and includes a generally cylindrical wall 4 having an open top enclosed by a roof 5. The stored material 2 is loaded into the silo through an opening 6 in the roof 5, and an unloader unit 7 is located in the bottom of the silo 1.

The unloader unit 7 is of a type commonly used, similar to that disclosed in the Tiedemann Patent 2,635,770. The unloader consists of a cutter arm 8, which is journaled for rotation about the center of the silo and above the foundation 3. The cutter arm 8 serves to cut or dislodge stored material and move the material to the center of the silo when it falls into a radially extending trough 9 formed in the foundation 3. A conveyor unit 10 is mounted within the trough 9 and extends through the housing 11, which is located on the exterior of the silo, and the outer end of housing 11 is provided with a discharge opening enclosed by a door 12. The conveyor unit 10 operates to discharge the stored material through door 12 to the exterior.

To allow partial balancing of extreme pressure differentials which occur between the interior and the exterior of the silo 1, a relief valve 14 is provided in the roof 5. When the pressure in the silo 1 exceeds the atmospheric pressure by a predetermined maximum amount, the relief valve 14 opens to permit air flow out of the head space 15 of the silo 1. Conversely, when the atmospheric pressure exceeds the pressure in the silo 1 by a predetermined maximum amount, the valve 14 opens to allow air flow into the headspace 15.

In accordance with the invention, a shelter 16 is disposed on the exterior of the silo 1. The shelter 16 is supported on a foundation 17 and includes a generally cylindrical wall 18 enclosed by a roof 19. The shelter 16 can be constructed in a similar manner and of materials identical to that of the silo 1. Thus, the shelter 16 may be constructed using glass lined, metal sheet segments commonly used in the silo 1.

A door 20 is provided in wall 18 of the shelter 16 to permit access to the interior, and a vent 21 is located in the roof 19 and has a vent screen 22 and a vent cover 23 so that air may enter the interior of the shelter and yet rain, snow or foreign materials are restricted from entry.

A pair of breather bags 24 are suspended from the wall 18 of shelter 16 in a vertically stacked relation.

The breather bags 24 are of a conventional type, being fabricated from a flexible, gas-impervious material. To suspend the bags 24 in the shelter 16, a belt 25, made of any suitable material, is secured around each breather bag 24 and has a series of belt holes 26 spaced around its entire circumference. Fastened through a number of the belt holes 26 are cables 27 which also are directed through corresponding pulleys 28 fastened on the wall 18 above the breather bags. The ends of the cables 27 are removably tied to hooks 29 secured to the interior of the wall 18. As the cables 27 are able to slide over the pulleys 28, the breather bags 24 are, thus, suspended from the wall 18 in a manner allowing vertical, and some horizontal, adjusting movement by manipulation of the cables 27. Adjustments may be required at times to maintain the spaced relation of the bags and at other times the bags may be removed for repair or maintenance. Sufficient space is generally allowed between the breather bags 24 to allow fuel expansion thereof.

The internal surfaces of the breather bags 24 are exposed to the pressure existing within the silo 1 by means of the conduit system 30. The conduit system 30 is opened to the head space 15 of the silo 1 by a curved connecting conduit 31 having one end suitably secured to a fitting in the roof 5 while the other end is connected to a T-fitting 32. A conduit 34 connects T-fitting 32 with a fitting 35 in the roof of shelter 16 and a hose 36 which communicates with the upper bag 24 also is connected to fitting 35 so that the interior of the bag is in communication with the head space 15 of the silo.

Also connected to the fitting 35 is a vertical conduit 37 which extends downwardly along the wall of the shelter and is connected to T-fitting 38. The horizontal connection of T-fitting 38 is secured to the fitting 39 in wall 18 which in turn is connected to the lower bag 24 through hose 40.

The lower connection of the T-fitting 38 is connected to conduit 41 and a valve 42 is mounted in conduit 41. The valve 42 can be of any suitable type and may be used for selectively opening the entire breather system of the invention to the atmosphere.

The conduit system 30 allows gas to flow between the silo 1 and the breather bags 24, and seals the system from atmospheric air.

In operation, when the silo 1 is at positive pressure with respect to the atmosphere, gas from the headspace 15 of the silo will flow into the bags 24, causing the bags to expand and thereby equalize the pressure. Conversely, the bags will deflate when the atmospheric pressure is greater than the internal pressure, causing gas to flow into the silo, and the gas flow will cease when the pressure differential is erased.

Various modes of carrying out the invention are contemplated as being within the scope of the following claims, particularly pointing out and distinctly claiming the subject matter which is regarded as the invention.

I claim:

1. In a storage unit having a generally sealed storage structure for storing perishable materials, a breather system including a shelter structure disposed exteriorly of the storage structure, said shelter structure having a generally cylindrical vertical wall and a roof together defining a breather chamber communicating with the atmosphere, a plurality of flexible gas impervious breather bags vertically stacked within said shelter structure, said bags being completely closed except for an inlet connection, a generally horizontal belt disposed around the periphery of each bag and having a circumference slightly less than the circumference of the cylindrical wall, each bag being restricted to a predetermined circular cross section in accordance with the circumference of the respective belt, said bags being expandable in a vertical direction, a suspension assembly connecting the belts and the shelter structure, and a conduit assembly connected between the inlet connections of the breather bags and the storage structure, said conduit assembly providing gas communication between the interior of the storage structure and the interior of the bags.

2. The combination of claim 1, wherein the suspension assembly for each bag includes a plurality of cable guide members disposed around the inner circumference of the cylindrical wall and attached to the wall at approximately the vertical position of the corresponding bag, at least two of the guide members being disposed at approximately diametrical opposite location on the shelter, and a plurality of cables, one end of each cable being attached to the corresponding belt, each cable being movably engaged with one of said guide members and the opposite end of each cable being removably attached to the shelter.

3. The combination of claim 2, wherein said guide members include a set of guide members for each bag, and each of said sets being vertically spaced from the other set, the spacing being in accordance with the maximum vertical expansion of the bags to dispose said bags in close adjacent relationship when the bags are in such maximum expanded condition.

4. In a storage unit having a generally sealed storage structure for storing perishable materials, a breather system including a shelter structure disposed exteriorly of the storage structure, the interior of said shelter structure defining a breathing chamber communicating with the atmosphere, a plurality of flexible gas impervious breather bags vertically stacked within said shelter structure, said bags being completely closed except for an inlet connection, a generally horizontal belt disposed around the periphery of each bag and located above the mid-point of the vertical height of the bag, each bag being restricted to a predetermined circular cross section in accordance with the circumference of the respective belt, said bags being expandable in a vertical direction, a suspension assembly connecting the belts and the shelter structure, and a conduit assembly connected between the inlet connection of the breather bags and the storage structure, said conduit assembly providing gas communication between the interior of the storage structure and the interior of the bags.

References Cited

UNITED STATES PATENTS

| | | |
|---|---|---|
| 2,257,941 | 10/1941 | Ellis. |
| 2,269,568 | 1/1942 | Wilkin. |
| 2,583,062 | 1/1952 | Riboud. |
| 2,722,171 | 11/1955 | Deringer. |
| 3,125,014 | 3/1964 | Herbruck. |
| 3,193,058 | 7/1965 | Ebbinghaus. |
| 3,211,303 | 10/1965 | Van Der Linde et al. |

WALTER A. SCHEEL, Primary Examiner

ARTHUR O. HENDERSON, Assistant Examiner

U.S. Cl. X.R.

220—85